United States Patent
Hulten et al.

(10) Patent No.: US 8,065,370 B2
(45) Date of Patent: Nov. 22, 2011

(54) PROOFS TO FILTER SPAM

(75) Inventors: Geoffrey J Hulten, Lynwood, WA (US);
Gopalakrishnan Seshadrinathan, Redmond, WA (US); Joshua T. Goodman, Redmond, WA (US); Manav Mishra, Kirkland, WA (US); Robert C J Pengelly, Seattle, WA (US); Robert L. Rounthwaite, Fall City, WA (US); Ryan C Colvin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/265,842

(22) Filed: Nov. 3, 2005

(65) Prior Publication Data

US 2007/0100949 A1    May 3, 2007

(51) Int. Cl.
*G06F 15/16* (2006.01)
(52) U.S. Cl. ........................................... 709/206
(58) Field of Classification Search .................. 709/206
See application file for complete search history.

(56) References Cited

U.S. PATENT DOCUMENTS

| | | |
|---|---|---|
| 5,377,354 A | 12/1994 | Scannell et al. |
| 5,459,717 A | 10/1995 | Mullan et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 5,911,776 A | 6/1999 | Guck |
| 5,930,471 A | 7/1999 | Milewski et al. |
| 5,999,932 A | 12/1999 | Paul |
| 5,999,967 A | 12/1999 | Sundsted |
| 6,003,027 A | 12/1999 | Prager |
| 6,023,723 A | 2/2000 | McCormick et al. |
| 6,041,321 A | 3/2000 | Fabbrizio et al. |
| 6,041,324 A | 3/2000 | Earl et al. |
| 6,047,242 A | 4/2000 | Benson |
| 6,052,709 A | 4/2000 | Paul |
| 6,072,942 A | 6/2000 | Stockwell et al. |

(Continued)

FOREIGN PATENT DOCUMENTS

CN    1350247(A)    5/2002

(Continued)

OTHER PUBLICATIONS

Allman, "Spam, Spam, Spam, Spam, Spam, the FTC, and Spam" Queue, Sep. 2003, pp. 62-69, vol. 1 Issue 6, ACM.

(Continued)

*Primary Examiner* — George Neurauter
*Assistant Examiner* — Suraj Joshi
(74) *Attorney, Agent, or Firm* — Lee & Hayes, PLLC

(57) ABSTRACT

Embodiments of proofs to filter spam are presented herein. Proofs are utilized to indicate a sender used a set amount of computer resources in sending a message in order to demonstrate the sender is not a "spammer". Varying the complexity of the proofs, or the level of resources used to send the message, will indicate to the recipient the relative likelihood the message is spam. Higher resource usage indicates that the message may not be spam, while lower resource usage increases the likelihood a message is spam. Also, if the recipient requires a higher level of proof than received, the receiver may request the sender send additional proof to verify the message is not spam.

19 Claims, 5 Drawing Sheets

U.S. PATENT DOCUMENTS

| | | | |
|---|---|---|---|
| 6,101,531 A | 8/2000 | Eggleston et al. | |
| 6,112,227 A | 8/2000 | Heiner | |
| 6,122,657 A | 9/2000 | Hoffman, Jr. et al. | |
| 6,128,608 A | 10/2000 | Barnhill | |
| 6,144,934 A | 11/2000 | Stockwell et al. | |
| 6,157,921 A | 12/2000 | Barnhill | |
| 6,161,130 A | 12/2000 | Horvitz et al. | |
| 6,167,434 A | 12/2000 | Pang | |
| 6,192,114 B1 | 2/2001 | Council | |
| 6,192,360 B1 | 2/2001 | Dumais et al. | |
| 6,195,698 B1 | 2/2001 | Lillibridge et al. | |
| 6,199,102 B1 | 3/2001 | Cobb | |
| 6,199,103 B1 | 3/2001 | Sakaguchi et al. | |
| 6,249,807 B1 | 6/2001 | Shaw et al. | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,324,569 B1 | 11/2001 | Ogilvie et al. | |
| 6,327,617 B1 | 12/2001 | Fawcett | |
| 6,330,590 B1 | 12/2001 | Cotten | |
| 6,332,164 B1 | 12/2001 | Jain | |
| 6,351,740 B1 | 2/2002 | Rabinowitz | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,427,141 B1 | 7/2002 | Barnhill | |
| 6,434,600 B2 | 8/2002 | Waite et al. | |
| 6,449,635 B1 | 9/2002 | Tilden, Jr. et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,519,580 B1 | 2/2003 | Johnson et al. | |
| 6,546,390 B1 | 4/2003 | Pollack et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,618,747 B1 | 9/2003 | Flynn et al. | |
| 6,633,855 B1 | 10/2003 | Auvenshine | |
| 6,643,686 B1 | 11/2003 | Hall | |
| 6,654,787 B1 | 11/2003 | Aronson et al. | |
| 6,684,201 B1 | 1/2004 | Brill | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,704,772 B1 | 3/2004 | Ahmed et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,785,820 B1 | 8/2004 | Muttik et al. | |
| 6,842,773 B1 | 1/2005 | Ralston et al. | |
| 6,853,749 B2 | 2/2005 | Watanabe et al. | |
| 6,868,498 B1 | 3/2005 | Katsikas | |
| 6,892,193 B2 | 5/2005 | Bolle et al. | |
| 6,901,398 B1 | 5/2005 | Horvitz et al. | |
| 6,915,334 B1 | 7/2005 | Hall | |
| 6,920,477 B2 | 7/2005 | Mitzenmacher | |
| 6,928,465 B2 | 8/2005 | Earnest | |
| 6,957,259 B1 | 10/2005 | Malik | |
| 6,971,023 B1 | 11/2005 | Makinson et al. | |
| 6,990,485 B2 | 1/2006 | Forman et al. | |
| 7,003,555 B1 | 2/2006 | Jungck | |
| 7,032,030 B1 | 4/2006 | Codignotto | |
| 7,039,949 B2 | 5/2006 | Cartmell et al. | |
| 7,051,077 B2 | 5/2006 | Lin | |
| 7,072,942 B1 | 7/2006 | Maller | |
| 7,089,241 B1 | 8/2006 | Alspector et al. | |
| 7,117,358 B2 | 10/2006 | Bandini et al. | |
| 7,146,402 B2 | 12/2006 | Kucherawy | |
| 7,155,243 B2 | 12/2006 | Baldwin et al. | |
| 7,155,484 B2 | 12/2006 | Malik | |
| 7,188,369 B2 | 3/2007 | Ho et al. | |
| 7,206,814 B2 | 4/2007 | Kirsch | |
| 7,219,148 B2 | 5/2007 | Rounthwaite et al. | |
| 7,249,162 B2 | 7/2007 | Rounthwaite et al. | |
| 7,263,607 B2 | 8/2007 | Ingerman et al. | |
| 7,287,060 B1 | 10/2007 | McCown et al. | |
| 7,293,063 B1 | 11/2007 | Sobel | |
| 7,320,020 B2 | 1/2008 | Chadwick et al. | |
| 7,321,922 B2 | 1/2008 | Zheng et al. | |
| 7,359,941 B2 | 4/2008 | Doan et al. | |
| 7,366,761 B2 | 4/2008 | Murray et al. | |
| 7,574,409 B2 | 8/2009 | Patinkin | |
| 7,600,255 B1 * | 10/2009 | Baugher | 726/22 |
| 7,711,779 B2 | 5/2010 | Goodman et al. | |
| 2001/0039575 A1 | 11/2001 | Freund et al. | |
| 2001/0046307 A1 | 11/2001 | Wong | |
| 2001/0049745 A1 | 12/2001 | Schoeffler | |
| 2002/0016824 A1 | 2/2002 | Leeds | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0124025 A1 | 9/2002 | Janakiraman et al. | |
| 2002/0129111 A1 | 9/2002 | Cooper | |
| 2002/0147782 A1 | 10/2002 | Dimitrova et al. | |
| 2002/0169954 A1 | 11/2002 | Bandini et al. | |
| 2002/0174185 A1 | 11/2002 | Rawat et al. | |
| 2002/0184315 A1 | 12/2002 | Earnest | |
| 2002/0199095 A1 | 12/2002 | Bandini et al. | |
| 2003/0009495 A1 | 1/2003 | Adjaoute | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0204569 A1 | 10/2003 | Andrews et al. | |
| 2003/0229672 A1 | 12/2003 | Kohn | |
| 2004/0003283 A1 * | 1/2004 | Goodman et al. | 713/201 |
| 2004/0015554 A1 | 1/2004 | Wilson | |
| 2004/0019650 A1 | 1/2004 | Auvenshine | |
| 2004/0019651 A1 | 1/2004 | Andaker | |
| 2004/0054887 A1 | 3/2004 | Paulsen, Jr. et al. | |
| 2004/0059697 A1 | 3/2004 | Forman | |
| 2004/0068543 A1 * | 4/2004 | Seifert | 709/206 |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 | 9/2004 | Kirsch | |
| 2004/0181571 A1 * | 9/2004 | Atkinson et al. | 709/200 |
| 2004/0193684 A1 | 9/2004 | Ben-Yoseph | |
| 2004/0199585 A1 | 10/2004 | Wang | |
| 2004/0199594 A1 | 10/2004 | Radatti et al. | |
| 2004/0205135 A1 | 10/2004 | Hallam-Baker | |
| 2004/0210640 A1 | 10/2004 | Chadwick et al. | |
| 2004/0215977 A1 | 10/2004 | Goodman et al. | |
| 2004/0255122 A1 | 12/2004 | Ingerman et al. | |
| 2004/0260776 A1 | 12/2004 | Starbuck et al. | |
| 2005/0015455 A1 | 1/2005 | Liu | |
| 2005/0015456 A1 * | 1/2005 | Martinson, Jr. | 709/207 |
| 2005/0021649 A1 * | 1/2005 | Goodman et al. | 709/207 |
| 2005/0041789 A1 | 2/2005 | Warren-Smith et al. | |
| 2005/0050150 A1 | 3/2005 | Dinkin | |
| 2005/0060643 A1 | 3/2005 | Glass et al. | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0081059 A1 | 4/2005 | Bandini et al. | |
| 2005/0091320 A1 | 4/2005 | Kirsch et al. | |
| 2005/0091321 A1 | 4/2005 | Daniell et al. | |

| | | | |
|---|---|---|---|
| 2005/0097174 | A1 | 5/2005 | Daniell |
| 2005/0102366 | A1 | 5/2005 | Kirsch |
| 2005/0108340 | A1 | 5/2005 | Gleeson et al. |
| 2005/0114452 | A1 | 5/2005 | Prakash |
| 2005/0120019 | A1 | 6/2005 | Rigoutsos et al. |
| 2005/0159136 | A1 | 7/2005 | Rouse et al. |
| 2005/0160148 | A1 | 7/2005 | Yu |
| 2005/0165895 | A1 | 7/2005 | Rajan et al. |
| 2005/0182735 | A1 | 8/2005 | Zager et al. |
| 2005/0188023 | A1 | 8/2005 | Doan et al. |
| 2005/0198270 | A1 | 9/2005 | Rusche et al. |
| 2005/0204005 | A1 | 9/2005 | Purcell et al. |
| 2005/0204006 | A1 | 9/2005 | Purcell et al. |
| 2005/0204159 | A1 | 9/2005 | Davis et al. |
| 2005/0228899 | A1 | 10/2005 | Wendkos et al. |
| 2006/0015942 | A1 | 1/2006 | Judge et al. |
| 2006/0026246 | A1* | 2/2006 | Fukuhara et al. ............ 709/206 |
| 2006/0031303 | A1 | 2/2006 | Pang |
| 2006/0031306 | A1 | 2/2006 | Haverkos |
| 2006/0031464 | A1 | 2/2006 | Bowman et al. |
| 2006/0036693 | A1 | 2/2006 | Hulten et al. |
| 2006/0036701 | A1 | 2/2006 | Bulfer et al. |
| 2006/0047769 | A1 | 3/2006 | Davis et al. |
| 2006/0059238 | A1 | 3/2006 | Slater et al. |
| 2006/0123083 | A1 | 6/2006 | Goutte et al. |
| 2006/0137009 | A1 | 6/2006 | Chesla |
| 2006/0168017 | A1 | 7/2006 | Stern et al. |
| 2006/0265498 | A1 | 11/2006 | Turgeman et al. |
| 2007/0101423 | A1 | 5/2007 | Oliver et al. |
| 2007/0118759 | A1 | 5/2007 | Sheppard |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |
| 2007/0143407 | A1 | 6/2007 | Avritch et al. |
| 2007/0208856 | A1 | 9/2007 | Rounthwaite et al. |
| 2008/0016579 | A1 | 1/2008 | Pang |
| 2008/0104186 | A1 | 5/2008 | Wieneke et al. |
| 2008/0114843 | A1 | 5/2008 | Shinde et al. |
| 2008/0120413 | A1 | 5/2008 | Mody et al. |
| 2009/0157708 | A1 | 6/2009 | Bandini et al. |

FOREIGN PATENT DOCUMENTS

| | | |
|---|---|---|
| EP | 0413537(A2) | 2/1991 |
| EP | 07203333(A2) | 7/1996 |
| EP | 1300997(A2) | 4/2003 |
| EP | 1376427(A2) | 1/2004 |
| JP | 10074172(1) | 3/1998 |
| JP | 2000163341(A) | 6/2000 |
| JP | 2001505371 | 4/2001 |
| JP | 2002149611(A) | 5/2002 |
| JP | 2002164887(A) | 6/2002 |
| JP | 2002330175(A) | 11/2002 |
| JP | 2002537727 | 11/2002 |
| JP | 2003115925(A) | 4/2003 |
| JP | 2003125005(A) | 4/2003 |
| JP | 2004186888(A) | 7/2004 |
| KR | 20010088973(A) | 9/2001 |
| KR | 20020063534(A) | 8/2002 |
| TW | 519591 | 2/2003 |
| TW | 520483 | 2/2003 |
| TW | 521213 | 2/2003 |
| WO | WO9635994(A1) | 11/1996 |
| WO | WO9910817(A1) | 3/1999 |
| WO | WO9937066(A1) | 7/1999 |
| WO | WO9967731(A1) | 12/1999 |
| WO | WO0146872(A1) | 6/2001 |
| WO | WO0219069(A2) | 3/2002 |
| WO | WO0223390(A2) | 3/2002 |
| WO | WO0230054(A1) | 4/2002 |
| WO | WO02071286(A2) | 9/2002 |
| WO | OW02082226(A2) | 10/2002 |
| WO | WO03054764 | 7/2003 |
| WO | WO03054764(A1) | 7/2003 |
| WO | WO2004054188 | 6/2004 |
| WO | WO2004059506(A1) | 7/2004 |

OTHER PUBLICATIONS

Androutsopoulos, et al., "An Experimental Cmparison of Naive Bayesain and Keywork-Based Anti-Spam Filtering with Personal E-mail Messges", Proceedings of the 23rd ACM SIGIR Conference, pp. 160-167, 2000.

Androutsopoulos, Learning to Filter Spam E-Mail: A Comparison of a Naive Bayesian and a Memory-Based Approach; 4th PKDD's Workshop on Machine Learning and Textual Information Access, 2000 13 pages.

Argamon, et al., "Routing documents according to style"; In First International Workshop on Innovative Information Systems, 1998. 8 pages.

Balter, et al., "Bifrost Inbox Organizer: Giving users control over the inbox"; NordiCHI Oct. 2, 2002, pp. 111-118, Arhus, Denmark.

Bowman, "Hotmail Spam Filters Block Outgoing E-mail"; CNET News.com, Jan. 18, 2001. 3 pages.

Breiman, et al., "Classification and Regression Trees"; Wadsworth & Brooks, Monterey, CA (1984).

Broder, et al., "Syntactic Clustering of the Web" SRC Technical note, Digital Corporation, Jul. 25, 1997. 13 pages.

Byrne, "My Spambook: Was Thwarting UCE Address Culling Programs"; Google, Newsgroups: news.admin.net-abuse.email. comp.mail.sendmail, comp.security.unix; Jan. 19, 1997, 2 pages.

"Camram Postage Stamp Basics", Internet Citation, Jun. 9, 2002, 17 pages.

"Clearswift Announces the Most Complete e-Policy-Based Email Content Security Product for Service Providers"; http://www.clearswift.com/news/item.aspx?ID=144. (Oct. 12, 2002).

Cohen, "Learning Rules that Classify E-Mail", In the proceedings of the 1996 AAA Spring Symposium on Machine Learning in information Access. Downloaded from William Cohen's web page: http:www.research.att.com/ncohen/pubs.html.

Cranor, et al., "Spam!" Communications of the ACM, 1998, pp. 74-83, vol. 41. No. 8.

Cunningham, et al., "A Case-Based Approach to Spam Filtering that Can Track Concept Drift" Trinity College, Dublin, Department of Computer Science, May 13, 2003.

Dwork, et al., "Pricing via Processing or Combatting Junk Mail"; Presented at Crypto 92; pp. 1-11.

European Search Report dated Apr. 6, 2006 and mailed Apr. 6, 2006 for EP 04102242, 3 pages.

European Search Report, dated Jun. 9, 2005, mailed Aug. 22, 2005 for European Patent Application Serial No. EP04011978, 12 pages.

European Search Report, EP31087TE900, mailed Nov. 11, 2004.

Fawcett, ""In vivo" Spam Filtering: A Challenge Problem for KDD"; SIGKDD Explorations, Dec. 2003. pp. 140-148, vol. 5 Issue 2, ACM.

Federal Trade Commission, "False Claims in Spam"; A report by the FTC's division of marketing practices, Apr. 30, 2003, http://www.ftc.gov/reports/spam/030429spamreport.pdf.

Gee, "Using Latent Semantic Indexing to Filter Spam" Dept. of Computer Science and Engineering, University of Texas-Arlington. 5 pages. Proceedings of the 2003 ACM symposium on Applied Computing. 2003 portal.acm.org.

Graham, "A Plan for Spam, Online" Aug. 2002, XP002273602, http://www.paulgraham.com/spam.html, retrieved on Mar. 12, 2004.

Graham, "The Future of Spam", Computer Security Journal, CSI Computer Security Institute, vol. XIX, No. 1, Jan. 2003, pp. 1-5.

Hansell, "Internet Is Losing Ground in Battle Against Spam"; the New York Times: Technology section, Apr. 22, 2003.

Hayes, "Spam, Spam, Spam, Lovely Spam"; American Scientist Online, Jun. 30, 2003. pp. 1-6. vol. 91.

Hidalgo, "Evaluating Cost-Sensitive Unsolicited Bulk Email Categorization"; SAC 2002, pp. 615-620, ACM Madrid, Spain.

How to Obscure Any URL, http:www.pc-help.org/obscure.htm, last viewed on Jan. 18, 2003, 10 pages.

Translated the Israel Office Action mailed Jan. 26, 2011 for Israeli Patent Application No. 206121, a counterpart foreign application of US Patent No. 7,558,832.

International Search Report dated Jan. 17, 2006, mailed Jan. 31, 2006, for PCT Application Serial No. PCT/US04/05501, 2 pages.

International Search Report, EP 03 00 6814, mailed Feb. 13, 2004.

Iwayama, et al., "Hierarchical Bayesian Clustering for Automatic Text Classification" Natureal Language; 1995; pp. 1322-1327.
Joachims, "Text Categorization with Support Vector Machines: Learning with Many Relevant Features", LS-8 Report 23, Nov. 1997, 18 pages.
Joachims, "Transductive Inference for Text Classification using Support Vector Machines", In Proceedings of the 16th International Conference on Machine Learning, 1999. pp. 200-209. Sabn Francisico, USA.
K. Mock. An Experimental Framework for Email Categorization and Management. Proceedings of the 24th Annual International ACM SIGIR Conference, pp. 392-393, 2001.
Kawamata, et al., "Internet Use Limitation", Started by Company, Part II. Full Monitoring/Limiting Software, NIKKEI Computer, No. 469, Nikkei Business Publications, Inc, May 10, 1999, pp. 87-91.
Knowles, et al. "Stop, in the Name of Spam". Communications of the ACM, Nov. 1998, pp. 11-14, vol. 41 No. 11, ACM.
Kohavi, "A study of cross-validation and bootstrap accuracy estimation and model selection", Proceedings of the Fourteenth International Joint Conference on Artificial Intelligence 2 (12), retrieved from http://dli.iiit.ac.in/ijcai/IJCAI-95-VOL2/PDF/016/pdf, 1995, pp. 1137-1143.
Koller, et al., "Hierarchically classifying documents using very few words"; In ICML 97: Proceedings of the Fourteenth International Conference on Machine Learning; San Francisco, CA; Morgan Kaufmann 1997; 9 pages.
Koller, et al., "Toward Optimal Feature Selection" Machine Learning; Proc. of the Thirteenth International Conference, Morgan Kaufmann, 1996, 9 pages.
Lewis, "Representation and learning in information retrieval" University of Massachusetts, 1992.
Lewis, et al., "A Comparison of Two Learning Algorithms for Text Categorization", Third Annual Symposium on Document Analysis and Information Retrieval; Apr. 11-13, 1994; pp. 81-93.
Lewis, "An Evaluation of Phrasal and Clustered Representations on a Text Categorization Task"; 15th Annual International SIGIR 92; Denmark 1992; pp. 37-50.
Li, et al., "Classification of Text Documents", Department of Computer Science and Engineering, Michigan State University, E. Lansing, Michigan, The Computer Journal, vol. 41, No. 8, 1998; 537-546.
Li, et al., "Secure Human-Computer Identification against Peeping Attacks (SecHCI): A Survey"; Technical Report, Microsoft Research, 2003. 53 pages.
Madigan, "Statistics and The War on Spam", Rutgers University, pp. 1-13, 2003.
Manco, et al., "Towards an Adaptive Mail Classifier"; In Proceedings of Italian Association for Artificial Intelligence Workshop, 2002. 12 pages.
Massey, et al., "Learning Spam: Simple Techniques for Freely-Available Software"; Proceedings of Freenix Track 2003 Usenix Annual Technical Conference, Online, Jun. 9, 2003, pp. 63-76, Berkley CA USA.
"MIME", The Microsoft Computer Dictionary, 5th ed. Redmond, WA; Microsoft Press. May 1, 2002.
Mimoso, "Quick Takes: Imagine Analysis, Filtering Comes to E-mail Security", http://searchsecurity.techtarget.com/originalContent.html (Feb. 5, 2002).
Mitchell, "Machine Learning", Carnegie Mellon Universy, Bayesian Learning, Chapter 6, pp. 180-184, The McGraw-Hill Companies, Inc. cc 1997.
Mock, "An Experimental Framework for Email Categorization and Management" Proceedings of the 24th Annual International ACM SIGIR Conference, pp. 292-293. 2001.
O'Brien, et al., "Spam Filters: Bayes vs. Chi-squared; Letters vs. Words" Proceedings of the 1st international symposium on Information and communication technologies, 2003, pp. 291-296, Dublin, Ireland.
OA dated Jan. 16, 2009 for U.S. Appl. No. 10/917,077, 34 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Oct. 8, 2008 for U.S. Appl. No. 11/743,466, 43 pages.
Palme, et al., "Issues when designing filters in messaging systems", Department of Computer and Systems Sciences, Stockholm University, Royal institute of Technology, Skeppargarten 73, S-115 30, Stockholm, Sweden, Computer Communications; 1996; 99. 95-101.
Pantel, et al., "Spam Cop: A Spam Classification & Organization Program"; In Proceedings AAAI-1998 Workshop on Learning for Text Categorization, 1998. 8 pages.
Partial European Search Report, EP05100847, mailed Jun. 21, 2005, 5 pages.
Quinlan, "C4.5: Programs for Machine Learning"; Morgan Kaufmann, San Francisco, CA (1993).
Rennie, "ifile: An Application of Machine Learning to E-Mail Filtering"; Proceedings of the KDD-2000 Workshop on Text Mining, Sixth ACM SIGKDD International Conference on Knowledge Discovery and Data Mining, 2000. 6 pages.
Rosen, "E-mail Classification in the Haystack Framework" Massachusetts Institute of Technology, Feb. 2003.
Shaami, et al., "A Bayesian Approach to Filtering Junk E-Mail" Sanford University, http://citeseerx.ist.psu.edu/viewdoc/summary?doi=10.1.1.48.1254, 1998.
Sahami, "Learning Limited Dependence Bayesian Classifiers" in KDD-96: Proceedings of the Second International Conference on Knowledge Discovery and Data Mining, AAAI Presss, 1996, Menlo Park, CA, pp. 335-338.
Schutze, et al., "A Comparison of Classifiers and Document Representations for the Routing Problem", Proceedings of the 18th Annual International ACM SIGIR Conference on Research and Development in Information Retrieval, Seattle, WA Jul. 9-13, 1995; pp. 229-237.
Sebastiani, "Machine Learning in Automated Text Categorization"; ACM Computing Surveys, vol. 34 Issue 1, pp. 1-47, 2002.
Segal, et al., "SwiftFile: An Intelligent Assistant for Organizing E-Mail", IBM Thomas J. Watson Reseach Center. Copyright 2000, American Association for Artificial Intelligence (www.aaal.org.
"Sender ID Framework Overview", retrieved from <<http://www.microsoft.com/mscorp.twc/privacy/spam/senderid/overview.mspx>> on Dec. 17, 2004, published Sep. 30, 2004.
"Sender ID: Two Protocols, Divided by a Common Syntax", retrieved from <<http://spf.pobox.com/senderid.html>> on Dec. 17, 2004, 2 pages.
Shimmin, B.F., "Effective use of electronic post", FENIX Publishing House, Rostov-na-Donu, 1998, pp. 229-249.
Simard, et al., "Using Character Recognition and Segmentation to Tell Computer from Humans", International Conference on Document Analysis and Recognition (ICDAR), IEEE Computer Society. Los Alamitos, pp. 418-423, 2003.
Skoll, David, How to Make Sure a Human is Sending You Mail, Newsgroup Citation, Online, Nov. 17, 1997, XP002267504, news.admin.net-abuse.usenet, http://groups.google.ca/groups.
Skoll, "How to Make Sure a Human is Sending You Mail", Google, Newsgroups: news.admin.net-abuse.usenet. Nov. 17, 1996.
Spertus, "Smokey: Automatic Recognition of Hostile Messages" Proceedings of the Conference on Innovative Applications in Artificial Intelligence (IAAI), 1997, 8 pages.
"SPF: Sender Policy Framework", retrieved from <<http://spf.pobox.com>> on Dec. 17, 2004, Copyright IC Group, Inc., 2004, 1 page.
Stop, in the Name of Spam, Communications of the ACM, Nov. 1998, pp. 11-14, vol. 41 No. 11, ACM.
Takkinen, et al., "CAFE: A Conceptual Model for Managing Information in Electronic Mail", Laboratory for Intelligent Infomation Systems, Department of Computer and Information Science, Linkoping University, Sweden, Conference on System Sciences, 1998 IEEE.
"The Coordinated Spam Reduction Initiative", Microsoft Corporation, Feb. 13, 2004, pp. 1-54.
Turner, et al., "Controlling Spam through Lightweight Currency"; In Proceedings of the Hawaii International Conference on Computer Sciences, Jan. 2004. 9 pages.
Turner, et al., "Payment-Based Email"; 5th International Conference on Software Engineering, Artificial Intelligence, Networking, and Parallel/Distributed Computing, Jun. 2004. 7 pages.
White, "How Computers Work"; QUE Publishing, 2004, pp. 238-239.

Wong, "Preventing Spams and Relays" Linux Journal, Dec. 1998, 6 pages, vol. 1998 Issue 56es, Specialized Systems Consultants, Inc.

Wong, "SPF Overview"; Linux Journal, Apr. 2004, 6 pages, vol. 2004 Issue 120, Specialized Systems Consultants, Inc.

Written Opinion of the International Preliminary Examing Authority mailed Nov. 30, 2005 for PCT/US03/41526, 5 pages.

Wu, et al., "A new anti-Spam filter based on data mining and analysis of email security"; Conference Proceedings of the SPIE, Data Mining and Knowledge Discovery Theory, Tools and Technology V, vol. 5098, Apr. 21, 2003, pp. 147-154, Orlando FL USA.

Yang, et al., "A Comparative Study on Feature Selection in Text Categorization" School of Computer Science, Carnegie Melton University, Pittsburgh, PA and Verity, Inc., Sunnyvale, CA; http://citeseerx.ist.psu.edu/viewdoc/summary?doi=10.1.1.32.9956; 1997; 9 pages.

Yang, et al., "An Example-Based Mapping Method for Text Categorization and Retrieval"; ACM Transactions on Information Systems, vol. 12, No. 3, Jul. 1994, pp. 252-277.

The Canadian Office Action mailed May 31, 2011 for Canadian Patent Application No. 2513967, a counterpart foreign application of US Patent No. 7,219,148.

* cited by examiner

PROOFS TO FILTER SPAM

BACKGROUND

The prevalence of message communication continues to increase as users utilize a wide variety of computing devices to communicate, one to another. For example, users may use desktop computers, wireless phones, and so on, to communicate through the use of email (i.e., electronic mail). Email employs standards and conventions for addressing and routing such that the email may be delivered across a network, such as the Internet, utilizing a plurality of devices. Thus, email may be transferred within a company over an intranet, across the world using the Internet, and so on.

Unfortunately, as the prevalence of these techniques for sending messages has continued to expand, the amount of "spam" encountered by the user has also continued to increase. Spam is typically thought of as an email that is sent to a large number of recipients, such as to promote a product or service. Because sending an email generally costs the sender little or nothing to send, "spammers" have developed which send the equivalent of junk mail to as many users as can be located. Even though a minute fraction of the recipients may actually desire the described product or service, this minute fraction may be enough to offset the minimal costs in sending the spam. Consequently, a vast number of spammers are responsible for communicating a vast number of unwanted and irrelevant emails. Thus, a typical user may receive a large number of these irrelevant emails, thereby hindering the user's interaction with relevant emails. In some instances, for example, the user may be required to spend a significant amount of time interacting with each of the unwanted emails in order to determine which, if any, of the emails received by the user might actually be of interest.

SUMMARY

Proof techniques to filter spam are described. Proofs may be utilized to indicate at least a minimal amount of resources were utilized by a sender in sending a message, thereby indicating that the sender is not likely a "spammer". Additionally, different proofs may utilize different amounts of resources. The different proofs, therefore, may be used for different likelihoods that a message will be considered spam. For instance, a client may use a locally-executable spam filter to determine a relative likelihood that a message will be considered spam and select a proof to provide a proportional level of "proof" to the message, thereby increasing the likelihood that the message will not be considered as "spam" by a recipient of the message, e.g., a communication service that communicates the message to an intended recipient and/or the intended recipient itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

As the prevalence of techniques for sending messages has continued to expand, the amount of "spam" encountered by the user has also continued to increase. Therefore, proofs may be utilized to differentiate between legitimate messages and messages that are sent by a spammer. For example a proof may be computed that requires a significant amount of resources (e.g., processing and/or memory resources) to be utilized in the computation over that typically required to send a message by a sender. A "memory bound" proof, for instance, may rely on memory latency to slow down computations that could be quickly performed if performed by a processor alone and therefore require an amount of time to process by a computing device. Therefore, presence of this result may indicate that the sender of the message performed the computation and therefore is not likely a spammer, which may therefore be used when processing the message, such as by a spam filter.

Additionally, different "levels" of proof may also be employed. For example, a computational proof having a particular amount of difficulty (e.g., requiring a certain amount of computer resources) may provide a certain amount of protection, while a computation proof having a greater amount of difficulty may be used to provide a corresponding greater amount of protection. Therefore, a sender may be "aware" of these levels and try to "guess" a proper amount of proof (e.g., difficulty) to be included with the message when communicated. Thus, senders of messages that do not look like spam may use relatively little proof while senders of messages that look like spam (e.g., a spammer) may use relatively larger amounts of proof. This improves the user experience for "good" users by allowing efficient use of proof that addresses the likely processing that will be performed on the message before the message is communicated.

In the following description, an exemplary environment is first described which is operable to employ the proof techniques. Exemplary procedures are then described which may operate in the exemplary environment, as well as in other environments.

Exemplary Environment

Figure 1:
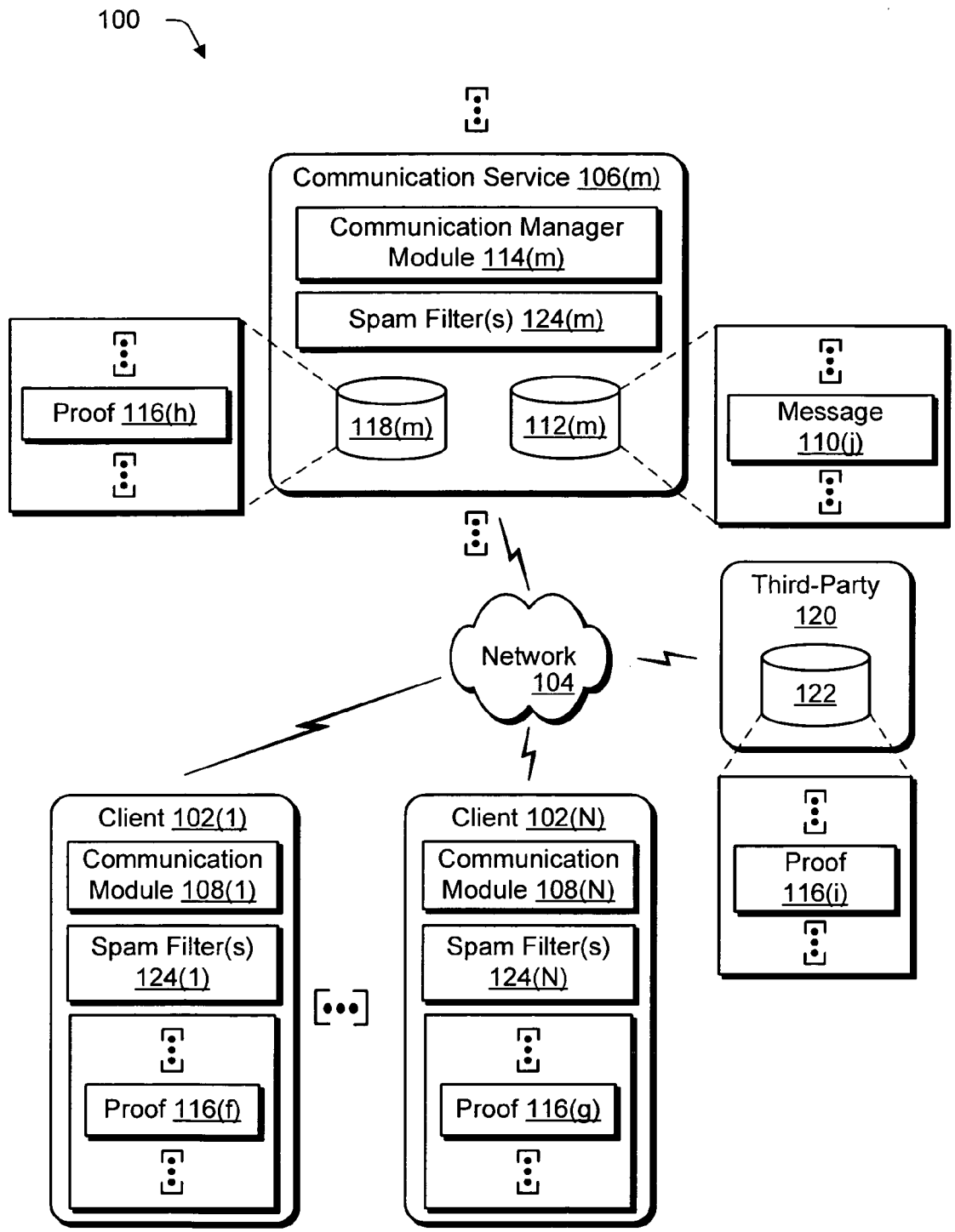
FIG. 1 is an illustration of an environment operable for communication of messages, such as emails, instant messages, and so on, across a network and is also operable to employ proof strategies.

FIG. 1 is an illustration of an environment 100 operable for communication of messages across a network. The environment 100 is illustrated as including a plurality of clients 102(1), ..., 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user, software and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(N) may be communicatively coupled via a peer-to-peer network to communicate, one to another. Each of the clients 102(1), 102(N) may also be communicatively coupled to one or more of a plurality of communication services 106($m$) (where "m" can be any integer form one to "M") over the Internet.

Each of the plurality of clients 102(1), ..., 102(N) is illustrated as including a respective one of a plurality of communication modules 108(1), ..., 108(N). In the illustrated implementation, each of the plurality of communication modules 108(1)-108(N) is executable on a respective one of the plurality of clients 102(1)-102(N) to send and receive messages. For example, one or more of the communication modules 108(1)-108(N) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 108(1)-108(N) may be configured to send and receive instant messages. Instant messaging provides a mechanism such that each of the clients 102(1)-102(N), when participating in an instant messaging session, may send text messages to each other. The instant messages are typically communicated in real time, although delayed delivery may also be utilized, such as by logging the text messages when one of the clients 102(1)-102(N) is unavailable, e.g., offline. Thus, instant messaging may be thought of as a combination of email and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In an implementation, the communication modules 106(1)-106(N) communicate with each other through use of the communication service 106($m$). For example, client 102(1) may form a message using communication module 108(1) and send that message over the network 104 to the communication service 106($m$) which is stored as one of a plurality of messages 110($j$), where "j" can be any integer from one to "J", in storage 112($m$) through execution of a communication manager module 114($m$). Client 102(N) may then "log on" to the communication service (e.g., by providing a name and password) and retrieve corresponding messages from storage 112($m$) through execution of the communication module 108(N). A variety of other examples are also contemplated.

In another example, client 102(1) may cause the communication module 108(1) to form an instant message for communication to client 102(N). The communication module 108(1) is executed to communicate the instant message to the communication service 106($m$), which then executes the communication manager module 114($m$) to route the instant message to the client 102(N) over the network 104. The client 102(N) receives the instant message and executes the respective communication module 108(N) to display the instant message to a respective user. In another instance, when the clients 102(1), 102(N) are communicatively coupled directly, one to another (e.g., via a peer-to-peer network), the instant messages are communicated without utilizing the communication service 106($m$). Although messages configured as emails and instant messages have been described, a variety of textual and non-textual messages (e.g., graphical messages, audio messages, and so on) may be communicated via the environment 100 without departing from the sprit and scope thereof. Additionally, computational proofs can be utilized for a wide variety of other communication techniques, such as to determine if a user will accept a voice-over-IP (VOIP) call or route the call to voicemail.

As previously described, the efficiently of the environment 100 has also resulted in communication of unwanted messages, commonly referred to as "spam". Spam is typically provided via email that is sent to a large number of recipients, such as to promote a product or service. Thus, spam may be thought of as an electronic form of "junk" mail. Because a vast number of emails may be communicated through the environment 100 for little or no cost to the sender, a vast number of spammers are responsible for communicating a vast number of unwanted and irrelevant messages. Thus, each of the plurality of clients 102(1)-102(N) may receive a large number of these irrelevant messages, thereby hindering the client's interaction with actual messages of interest.

One technique which may be utilized to hinder the communication of unwanted messages is through the use of a computational proof, i.e., "proofs". Proofs provide a technique that allows a sender of a message to prove their "non-spammer" intentions through use of a proof that enables the sender to indicate that a significant amount of hardware and/or software resources were expended by the client in the communication of the message. For example, clients 102(1)-102(N) are each illustrated as including a respective plurality of proofs 116($f$), 116($g$), where "f" and "g" can be any integer from one to "F" and "G", respectively. Proof of effort algorithms generally involve use of a significant amount of computing resources (e.g., hardware and software resources) when solving a defined proof, e.g., a hash collision, a solution to a cryptographic problem, a solution to a memory bound problem, a solution to a reverse Turing test, and so on. As previously described, it typically requires few resources for a spammer to send a message. Therefore, by indicating that resources have been utilized by a sender of the message, the sender may indicate a decreased likelihood of being a spammer.

In the illustrated environment, the communication service 102($m$) is also illustrated as including a plurality of proofs 116($h$), where "h" can be any integer from one to "H", which are stored in storage 118($m$). Therefore, the communication service 102($m$) in this instance may be used on part of one or more of the clients 102(1)-102(N) in the performance of the proofs 116($h$). In another example, a third party 120 may also compute one or more of a plurality of proofs 116($i$) (where "i" can be any integer from one to "I") which are illustrated as stored in storage 122. For instance, the third party 120 may be configured as a web service to compute the proofs 116($i$) when one or more of the clients 102(1)-102(N) is configured as a "thin" client as previously described. Therefore, the thin client may offload the computation of the proof to the third party to compute the proof. In another instance, the third party 120 is another computing device that is owned/accessible by the user (e.g., a desktop computer, work server, and so on) such that the user may transfer computation of the proofs between the user's computing devices before output to an intended recipient, such as from a wireless phone to a home computer, after which the message is then communicated for receipt by an intended recipient. A variety of other instances are also contemplated.

Because computation of the proofs indicates a decreased likelihood that a sender of the message is a "spammer", spam filters employed in the environment 100 may take this into account when processing a message. For example, clients 102(1)-102(N) each include respective spam filters 124(1)-124(N) which are utilized to process messages received by the clients in order to "filter out" spam from legitimate messages. Spam filters 124(1)-124(N) may utilize a variety of techniques for filtering spam, such as through examination of message text, indicated sender, domains, and so on. The spam filters 124(1)-124(N), when processing the messages, may also take into account whether the message includes a result of a computational proof when determining whether the message is spam. Similar functionality may be employed by the spam filters 124($m$) provided on the communication service 102($m$). Therefore, a result of a computational proof may be utilized to obtain "safe passage" of the message through spam filters 124(1), 124(N), 124($m$) employed in the environment 100.

Different amounts of resources, however, may be expended when computing different proofs 116($f$), 116($g$), 116($h$), 116($i$). For example, computation of a first one of the proofs 116($f$) may more hardware and software resources than computation of another one of the proofs 116($f$). Therefore, the spam filters 124(1)-124(N) may also be configured to address the amount of computation utilized to perform the respective proofs when determining whether or not a message is spam, further discussion of which may be found in relation to the following figure.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the proof strategies described below are platform-independent, meaning that the strategies may be implemented on a variety of commercial computing platforms having a variety of processors.

Figure 2:
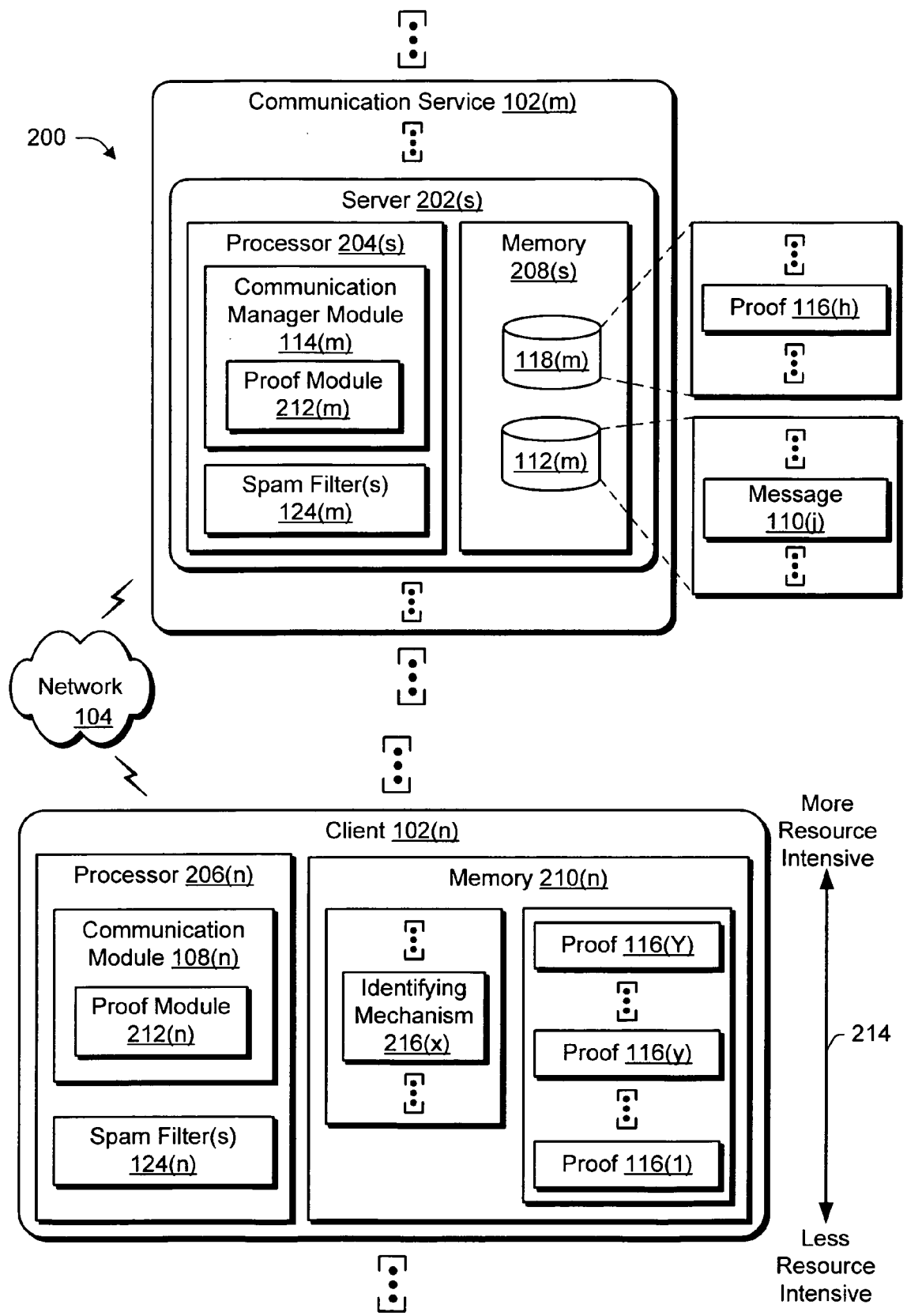
FIG. 2 is an illustration of a system in an exemplary implementation showing a plurality of clients and a communication service of FIG. 1 in greater detail.

FIG. 2 is an illustration of a system 200 in an exemplary implementation showing the plurality of clients 102($n$) and the communication service 106($m$) of FIG. 1 in greater detail. Client 102($n$) is representative of any of the plurality of clients 102(1)-102(N) of FIG. 1, and therefore reference will be made to client 102($n$) in both singular and plural form. The communication service 102($m$) is illustrated as being implemented by a plurality of servers 202($s$), where "s" can be any integer from one to "S", and the client 102($n$) is illustrated as a client device. Further, the servers 202($s$) and the clients 102($n$) are illustrated as including respective processors 204($s$), 206($n$) and respective memory 208($s$), 210($n$).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208($s$), 210($n$) is shown for the respective server 202($s$) and client 102($n$), memory 208($s$), 210($n$) may be representative of a wide variety of types and combinations of memory may be employed, such as random access memory (RAM), hard disk memory, removable medium memory, and other computer-readable media.

The clients 102($n$) are illustrated as executing the communication module 108($n$) and the spam filters on the processor 206($n$), which are also storable in memory 210($n$). Additionally, the communication module 108($n$) is illustrated as including a proof module 212($n$), which is representative of functionality to select and perform proofs 116(1), . . . , 116($y$), . . . , 116(Y) (which may or may not correspond to the proofs 116($f$), 116($g$) of FIG. 1). For example, the communication module 108($n$), when executed, may be utilized to form a message for communication over the network 104. Before the message is communicated, the communication module 108($n$) may process the message using the client's 102($n$) spam filter 124($n$) to determine a likelihood of whether the message, as is, will be considered spam by an intended recipient and/or a communication service 106($m$) configured to communicate the message to the intended recipient. When the message is considered spam, the proof module 212($n$) may perform one or more of the proofs 116(1)-116(Y), a result of which is then combined with the message before communication over the network 104. In this way, the client 102($n$) may indicate, through the use of the proof, that the message is not spam and in this case the client makes the determination of whether to even perform one or more of the proofs 116(1)-116(Y) without contacting an intended recipient before hand. Further discussion of processing a message by a spam filter before communication over the network may be found in relation to FIG. 3.

As previously described, proofs 116(1)-116(Y) may require different amounts of resources to be performed, which is illustrated in FIG. 2 by an arrow 214 that indicates that proof 116(Y) is more resource intensive than proof 116($y$), which is more resource intensive than proof 116(1). For example, different proof mechanisms may include parameters that specify a particular difficult, e.g., in a hash collision case an "N" bit collision may be utilized in which as "N" increases computation time increases exponentially. These differences in resource amounts may also be utilized in conjunction with an indication of a relative likelihood that the message will be considered spam to select an appropriate proof 116(1)-116(Y) to be performed before communication of the message. For example, a message that, when processed by the spam filter 124(n) indicates a relatively low likelihood of being considered spam may include a result of a proof 116(1) that consumes relatively low resources, when performed. On the other hand, a message that, when processed by the spam filter 124(n) indicates a relatively high likelihood of being considered spam may include a proof 116(Y) that consumes a relatively high amount of resources. In this way, the proof module 214 may select the proof 116(1)-116(Y), and even choose to forgo inclusion of a proof, in a manner which conserves resources of the client 102(n) yet still indicates that the client 102(n) is not a spammer. Further discussion of proof selection may be found in relation to FIG. 4.

The results of the proofs 116(1)-116(Y) may be combined with a variety of identifying mechanisms 216(x) that may also indicate a relative likelihood that a message is spam and/or sent by a spammer. For example, when a user receives a message, the communication modules 108(n) and/or manager module 114(m) gather and validate messages utilizing one or more applicable identifying mechanisms 216(x). For example, the identifying mechanisms 216(x) may involve checking that part of a message is signed with a specific private key, that a message was sent from a machine that is approved via a sender's identification for a specified domain, and so on. A variety of identifying mechanisms 216(x) and combinations thereof may be employed by the communication modules 108(n), 114(m), and/or the spam filters 124(n), 124(m), examples of which are described as follows.

Email Address

The email address is a standard form of identity. The email address may be checked by looking at a 'FROM' line in the header of a message. Although the email address may be particularly vulnerable to attack, a combination of the email address and another one of the identifying mechanisms 216(x) and/or the proofs 116(1)-116(Y) may result in substantial protection.

Third Party Certificates

Third party certificates may involve the signing of a portion of a message with a certificate that can be traced to a third-party certifier. This signature can be attached utilizing a variety of techniques, such as through secure/multipurpose Internet mail extension (S/MIME) techniques, e.g., by including a header in the message that contains the signature. The level of security provided by this technique may also be based on the reputation of the third party certifier, a type of certificate (e.g. some certifiers offer several levels of increasingly secure certification), and on the amount of the message signed (signing more of the message is presumably more secure).

Self-Signed Certificate

A self-signed certificate involves signing a portion of a message with a certificate that the sender created. Like a third-party certificate, this identifying mechanism may be attached using a variety of techniques, such as through secure/multipurpose Internet mail extension (S/MIME) techniques, e.g., by including a header in the message that contains the signature. In an implementation, use of a self-signed certificate involves the creation of a public/private key pair by a sender, signing part of the message with the private key, and distributing the public key in the message (or via other standard methods). The level of security provided by this method is based on the amount of the message signed.

Passcode

The passcode identifying mechanism involves the use of a passcode in a message, such as by including a public key in a message but not signing any portion of the message with the associated private key. This identity mechanism may be useful for users who have mail transfer agents that modify messages in transfer and destroy the cryptographic properties of signatures, such that the signatures cannot be verified. This identifying mechanism is useful as a lightweight way to establish a form of identity. Although a passcode is still potentially spoofable, the passcode may be utilized with other identifying mechanisms to provide greater likelihood of verification (i.e., authenticity of the sender's identity).

IP Address

The IP address identifying mechanism involves validating whether a message was sent from a particular IP address or IP address range (e.g. the IP/24 range 204.200.100.*). In an implementation, this identity mechanism may support a less secure mode in which the IP address/range may appear in any of a message's "received" header lines. As before, the use of a particular IP address, IP address range, and/or where the IP address or range may be located in a message can serve as a basis for a relative likelihood that the message was sent from a spammer.

Valid Sender ID

The valid Sender ID identifying mechanism involves validating whether a message was sent from a computer that is authorized to send messages for a particular domain via the Sender's ID. For example, reference may be made to a trusted domain. For instance, "test@test.com" is an address and "test.com" is the domain. It should be noted that the domain does not need to match exactly, e.g. the domain could also formatted as foo.test.com. When a message from this address is received, the communication module 108(n) may perform a Sender ID test on the "test.com" domain, and if the message matches the entry, it is valid. This identifying mechanism can also leverage algorithms for detecting IP addresses in clients and any forthcoming standards for communicating IP addresses from edge servers, standards for communicating the results of Sender ID checks from the edge servers, and so on. Additionally, it should be noted that the Sender ID test is not limited to any particular sender identification technique or framework (e.g., sender policy framework (SPF), sender ID framework from MICROSOFT (Microsoft is a trademark of the Microsoft Corporation, Redmond, Wash.), and so on), but may include any mechanism that provides for authentication of a user or domain.

Monetary Attachment

The monetary attachment identifying mechanism involves inclusion of a monetary amount to a message for sending, in what may be referred to as an "e-stamp". For example, a sender of the message may attach a monetary amount to the message that is credited to the recipient. By attaching even a minimal monetary amount, the likelihood of a spammer sending a multitude of such messages may decrease, thereby increasing the probability that the sender is not a spammer. A variety of other techniques may also be employed for monetary attachment, such as through a central clearinghouse on the Internet that charges for certifying messages. Therefore, a certificate included with the message may act to verify that the sender paid an amount of money to send the message. Although a variety of identifying mechanisms have been described, a variety of other identifying mechanisms 216(x) may also be employed without departing from the sprit and scope thereof. Further discussion of message processing may be found in relation to the following figures.

Exemplary Procedures

The following discussion describes proof techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 3:
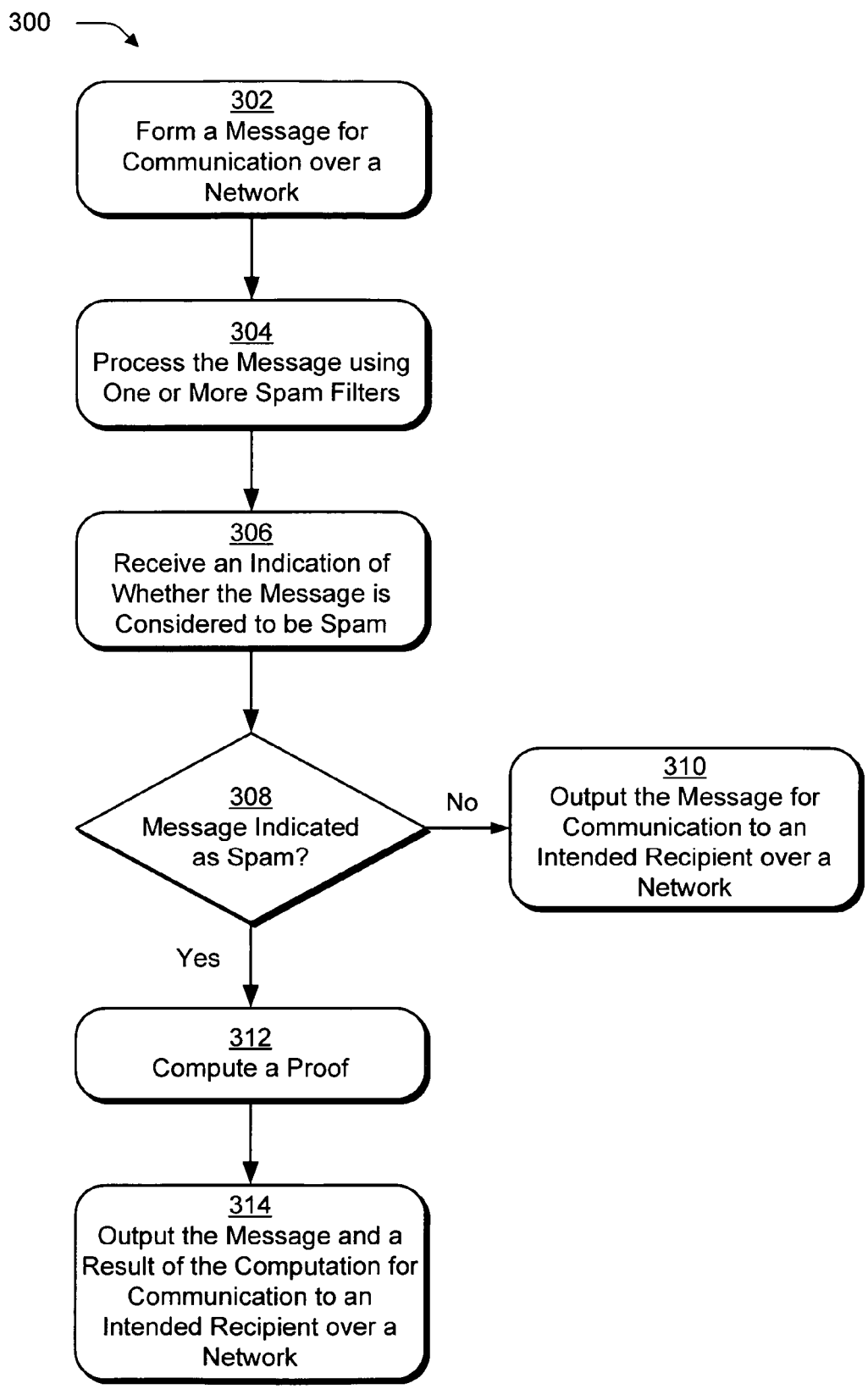
FIG. 3 is a flow chart depicting a procedure in an exemplary implementation in which processing of a message is performed by local spam filters to determine whether a result of a proof should be included before communication of the message to an intended recipient.

FIG. 3 depicts a procedure 300 in an exemplary implementation in which processing of a message is performed by local spam filters to determine whether a result of a proof should be included before communication of the message to an intended recipient. A message is formed for communication over a network (block 302). For example, the communication module 108(1) may be executed to compose an email, an instant message, and so on.

The message is then processed using one or more spam filters (block 403). The communication module 108(1), for instance, may forward the composed message to spam filters 124(1) that are local on the client 102(1). From the processing, an indication is received as to whether the message is considered to be spam (block 306). The indication, for instance, may be configured as a binary indictor (e.g., "yes" or "no") as to whether the message is considered spam by that spam filter 124(1). Therefore, the indication is utilized to determine whether the message is considered spam (decision block 308).

When the message is not indicated as spam ("no" from decision block 308), the message is output for communication to an intended recipient over a network (block 310). Thus, the client 102(1) in this instance determines that the message is not likely to be considered spam by the intended recipient, and therefore may simply communicate the message without performing another action.

When the message is indicated as spam ("yes" from decision block 308), a proof is computed (block 312). A result of the computation and the message are then output for communication to an intended recipient over a network (block 314). Thus, in the instance the client 102(1) determines that the message is likely considered to be spam and therefore computes a proof to indicate the "non-spammer" intentions of the client 102(1).

Although a binary indication was described as being output from the spam filters, a relative likelihood (e.g., a score) may also be output and leveraged by the computational proofs. For example, an additional threshold may be utilized in conjunction with the spam filter's indication to protect from spam filters that are likely to be more aggressive than the spam filter employed by the client 102(1), such as spam filter employed by a communication service 106(m). In this way, the additional threshold may account for out-of-date spam filters that find the message "more spammy" than the sender's filter. For instance, the threshold may be based on an update frequency of the spam filter 124(1), with more rapid updates requiring smaller thresholds.

Additionally, logic may be employed for specific intended recipients and/or communicators of the message. For instance, a particular communication service may filter more aggressively, and therefore a larger threshold may be employed. In an implementation, messages that are sent to recipients within a local domain are not pre-processed, e.g., when recipients are located on a global address list, when recipients are included in a local domain of a sender, and son on. A variety of other instances are also contemplated, an example of which is described as follows.

Figure 4:
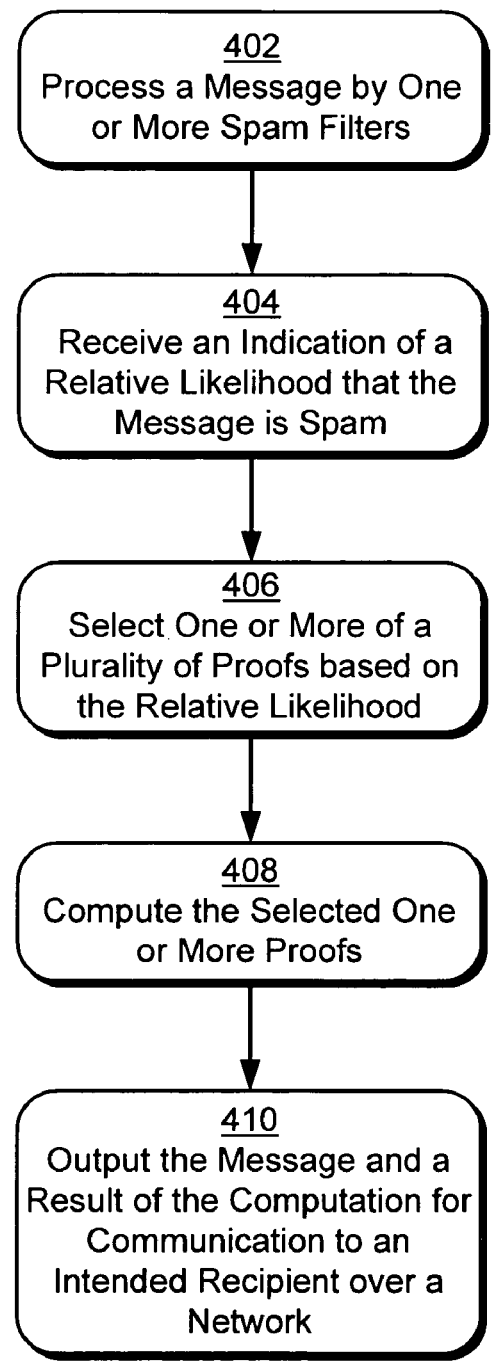
FIG. 4 is a flow chart depicting a procedure in an exemplary implementation in which one or more proofs are selected based on a relative likelihood that a message will be considered spam.

FIG. 4 depicts a procedure 400 in an exemplary implementation in which one or more proofs are selected based on a relative likelihood that a message will be considered spam. In the previous example, an implementation was described in which an indication of "spamminess" of a message may be relative, such as provided by a score in which higher numbers indicate an increased likelihood of being spam. This relative likelihood may also be utilized to select one or more proofs such that different "levels" of proof may be employed based on the relative likelihood of the message being considered spam. As before, a message is processed by one or more spam filters (block 402) and an indication is received of a relative likelihood that the message is considered to be spam (block 404), such as a numerical score, a relative indication of a degree of "spamminess", and so on.

One or more of a plurality of proofs are then selected based on the relative likelihood (block 406). Thus, the communication module 108(1) may determine a level of proof that is proportion to the apparent "spamminess" of the message. For example, if the message is almost certainly not spam, the client 102(1) may select a proof requiring a minimal amount of resources to compute. However, if the message is significantly "spammy", the client 102(1) may select one or more proofs requiring a significantly greater amount of resources to compute. The selected one or more proofs are then computed (block 408) and the message and a result of the computation is output for communication to an intended recipient over a network (block 410).

Thus, in this example, the "amount" of proof is selected based on a guess as to how much proof will be required to bypass the intended recipient's, as well as communication services that communicate the message, spam filters. This guess may also be based on the local spam filter 124(1) (e.g., is it up-to-date), knowledge of receiver's filters (e.g., the communication service 106(m) employs aggressive spam filters), and so on. In the previous example, the computations performed were "sender driven", in that, the sender (e.g., client 102(1)) made a guess as to whether the recipients (e.g., communication service 106(m) and client 102(N)) would consider the message to be spam. This determination may also be made, at least in part, through communication with a recipient of the message, an example of which is described in relation to the following figure.

Figure 5:
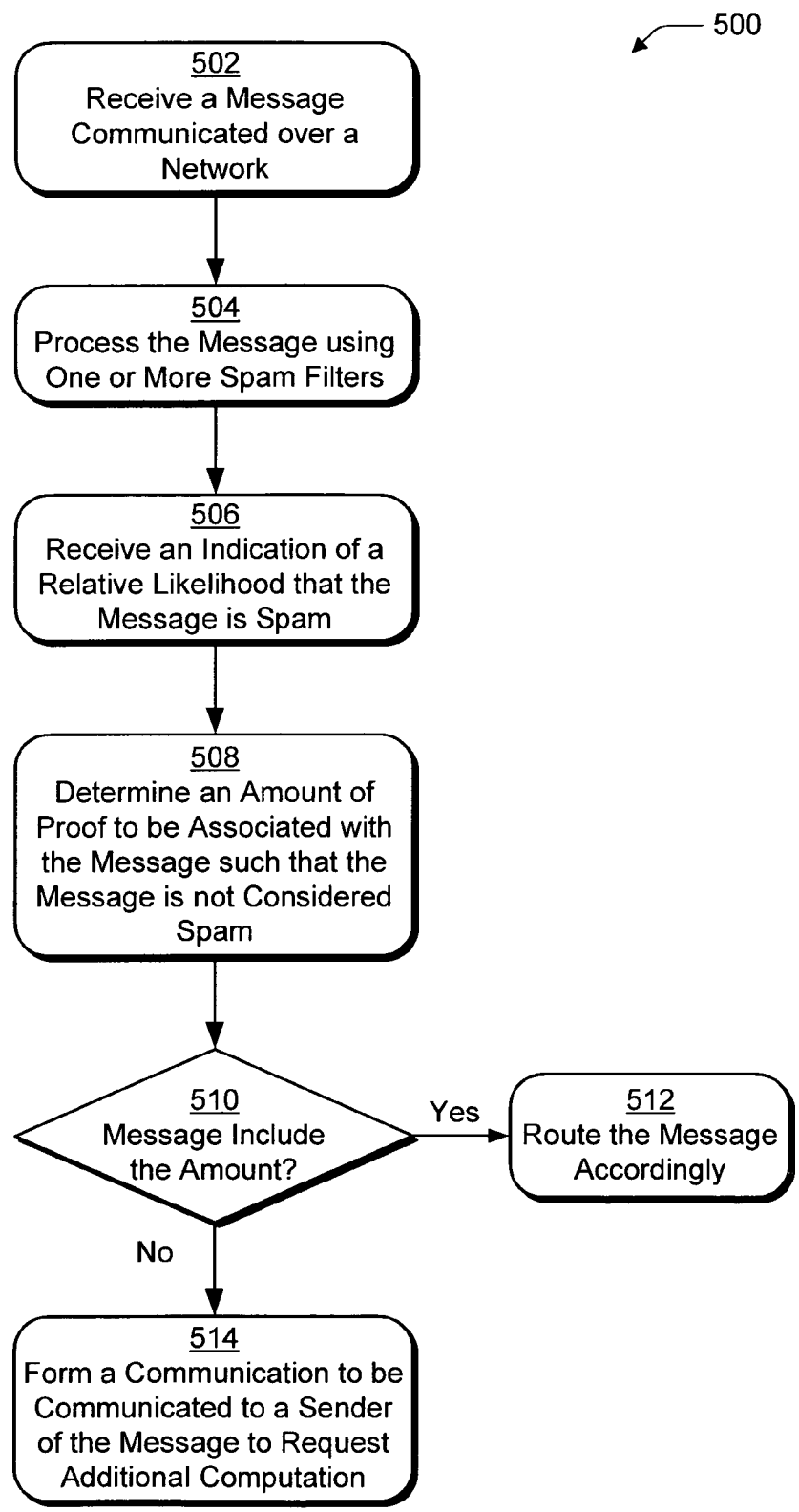
FIG. 5 is a flow chart depicting a procedure in an exemplary implementation in which receiver-driven computation is performed.

FIG. 5 depicts a procedure 500 in an exemplary implementation in which receiver-driven computation is performed. A message is received over a network (block 502) and processed using one or more spam filters (block 504). For example, the communication service 106(m) may receive a message from client 102(1) and process the message using the spam filters 124(m). An indication is then received of a relative likelihood that the message is spam (block 506).

Based at least in part on the indication, a determination is made as to an amount of proof to be associated with the message such that the message is not considered spam (block 508). For instance, the indication may be configured as a numerical score, which may then be utilized to determine a proportional amount of proof (e.g., more or less computation) such that, when included, the message is not considered to be spam. Additional indicators may also be utilized when making this determination, such as through use of the identity mechanisms 216(x) previously described in relation to FIG. 2. Thus, a variety of factors may be utilized to determine the "amount" of proof to be included with the message.

A determination is then made as to whether the message includes the amount (decision block 510). If so ("yes" from decision block 512), the message is routed accordingly, e.g., to a client's inbox. If not ("no" from decision block 512), a communication is formed to be communicated to a sender of the message to request additional computation (block 514). Thus, in this instance, a receiver (e.g., a communication service 102(m) and/or the client 102(N) that is the intended recipient) may report back that additional proof is needed before further processing and/or routing, e.g., passing to an inbox, pushing to the intended recipient, and so forth. In other words, the recipient may communicate back that the sender's "guess" was wrong. Further, the recipient may also "give credit" to previous amounts of "proof" that were included in the message when requiring the additional proof, e.g., the sender's guess plus the additional proof required equals the minimum amount of proof needed to allow the message to be routed to a user's inbox. Thus, this cost may put an asymmetric burden of proof on spammers because receivers will require larger amount of proof before the receiver is willing to place a "spammy" message in the intended recipient's inbox.

These techniques may also be employed to address a situation, in which, the spam filters are not synchronized, e.g., one spam filter has been updated and another one has not. For example, due to a lack of synchronization, the sender (e.g., client 102(1)) might "guess" incorrectly, and therefore messages sent by the sender may end up in the intended recipients' (e.g., client 102(N)) "junk" mail folder. Therefore, by requesting additional proof, this situation may be avoided.

In an implementation, a recipient (e.g., the communication service 102(m) and/or the intended recipient, client 102(N)) may choose not to inform the sender (e.g., client 102(1)) that addition proof is required in order to avoid "web bugs" (i.e., techniques that spammers use to determine when a receiver reads a message) and address book mining (i.e., techniques used by spammers to determine when an account is live, and thus worth spamming). In such an instance, the recipient may require a certain minimum amount of proof before requesting additional proof from a sender. Thus, the amount of initial proof may be set such that using receiver-driven computation as a surrogate for web bugs and address book mining is uneconomical for spammers. In another example, the "challenge" may be limited to instances in which the sender indicated a willingness to receive challenges, such as in an email header field.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    processing an outgoing message using one or more spam filters on a client computer;
    computing, via the client computer, a result from a proof to be included with the outgoing message that is communicated over a network to an intended recipient when the processing indicates that the outgoing message is considered spam, wherein an extent of processing performed by computing resources used to calculate the proof varies based on the relative probability the outgoing message is spam and the indicated relative probability the outgoing message is spam includes an additional threshold to protect from spam filters that are likely to be more aggressive than the one or more spam filters employed by the client computer;
    selecting the proof from a plurality of proofs based on the indicated relative probability the outgoing message is spam, such that selecting includes:
        selecting a complex proof that uses a higher amount of computer resources as the proof when the relative probability the outgoing message is spam is higher; and
        selecting a simple proof that uses a lower amount of computer resources as the proof when the relative probability the outgoing message is spam is lower;
    attaching the result from the proof with the outgoing message before the outgoing message is sent to the intended recipient, the result from the proof being included in the outgoing message as evidence that a sender of the outgoing message expended additional computer resources to indicate the outgoing message is less likely to be spam; and
    receiving a communication from the intended recipient indicating that the result attached to the outgoing message is not enough evidence that the message is less likely to be spam.

2. A method as described in claim 1, wherein the outgoing message is an email or an instant message.

3. A method as described in claim 1, wherein the proof is a Proof of Effort (POE) algorithm.

4. A method as described in claim 1, wherein the processing and the computing are performed:
    on a client that composed the outgoing message; and
    before the outgoing message is communicated over the network.

5. A method as described in claim 1, wherein:
    the processing indicates a relative probability that the outgoing message is spam; and
    the proof is selected from a plurality of proofs based on the indicated relative probability and an identity mechanism utilized by the outgoing message to identify a sender of the message.

6. A method as described in claim 1, further comprising outputting the outgoing message and the result of the computation to be communicated to an intended recipient over the network.

7. A method comprising:
    determining a relative probability that an outgoing message is spam by processing the outgoing message using one or more spam filters of a computing device;
    selecting one or more proofs for the outgoing message, a result of the one or more proofs to be computed by the computing device based on the relative probability the outgoing message is spam, wherein the proof for the outgoing message is an extraneous operation performed by a client computer that is unrelated to the computing device that determines the relative probability that the outgoing message is spam;
    wherein a complex proof that uses a higher amount of computer resources is selected for the outgoing message from the one or more proofs when the relative probability the outgoing message is spam is higher;
    wherein a simple proof that uses a lower amount of computer resources is selected for the outgoing message from the one or more proofs when the relative probability the outgoing message is spam is lower;
    including the result of the one or more proofs with the outgoing message before the outgoing message is communicated over a network to an intended recipient; and
    receiving a response from the intended recipient over the network indicating that the result of the one or more proofs for the outgoing message included with the outgoing message does not represent a sufficient amount of computer resources to indicate that the outgoing message is less likely to be spam.

8. A method as described in claim 7, wherein the determining and the selecting are performed:
- before the outgoing message is received by an intended recipient; and
- by a client that composed the outgoing message before communication over a network.

9. A method as described in claim 8, wherein the determining is not performed when an intended recipient of the outgoing message is in a same domain as a sender of the outgoing message.

10. A method as described in claim 8, wherein the determining and the selecting are performed by a communication service that receives the outgoing message from a client that composed the outgoing message.

11. A method as described in claim 7, wherein the determining is based at least in part on an identity mechanism utilized by the outgoing message to identify a sender of the outgoing message.

12. A method as described in claim 7, wherein each said proof is a Proof of Effort (POE) algorithm.

13. A method as described in claim 7, further comprising outputting the outgoing message and a result of the computation of the selected one or more said proofs for communication to the intended recipient over a network.

14. Computer memory device storing computer-executable instructions that, when executed on one or more processors, performs acts comprising:
- computing a result from a proof for an outgoing message, the result to be included with the outgoing message that is communicated over a network to an intended recipient upon an indication that the outgoing message has a relative probability of being spam;
- determining a relative amount of requested processing to be performed by computing resources used to calculate the result of the proof for the outgoing message based on the relative probability that the outgoing message is spam, the proof for the outgoing message being at least one of a hash collision, a solution to a cryptographic problem, a solution to a memory bound problem, or a solution to a reverse Turing test;
- selecting the proof for the outgoing message from a plurality of proofs based on the relative amount of requested processing such that a complex proof that uses a larger amount of computer resources is selected as the proof for the outgoing message when the relative probability the outgoing message is spam is higher, and a simple proof that uses a smaller amount of computer resources is selected as the proof for the outgoing message when the relative probability the outgoing message is spam is lower;
- attaching the result from the proof for the outgoing message with the outgoing message before the outgoing message is sent to the intended recipient, the result from the proof for the outgoing message being included in the outgoing message as evidence that a sender of the outgoing message expended additional computer resources to indicate the outgoing message is less likely to be spam;
- sending the outgoing message with the attached result to the intended recipient;
- receiving a reply from the intended recipient in response to the sending, the reply indicating that the result of the proof for the outgoing message attached to the outgoing message is not enough evidence that the outgoing message is less likely to be spam; and
- sending an updated outgoing message to the intended recipient, the updated outgoing message including the result of the proof for the outgoing message and further including an additional result of an additional proof for the outgoing message computed in response to the receiving the reply.

15. A method as described in claim 1, further comprising:
- computing, via the client computer, an additional result from an additional proof to be included with the outgoing message that is communicated over the network to the intended recipient; and
- attaching the additional result from the additional proof along with the result to the outgoing message before the outgoing message is sent again to the intended recipient, the additional result included along with the result in the outgoing message as further evidence that the outgoing message is less likely to be spam.

16. A method as described in claim 7, further comprising including an additional result of an additional proof along with the result of the one or more proofs in a re-communication of the outgoing message over the network to the intended recipient in response to the receiving the response.

17. A method as described in claim 1, wherein at least one of:
- the processing includes determining, by the one or more spam filters on the client computer, whether to perform one or more proofs; or
- the processing is based, at least in part, on an up-to-date status of the one or more spam filters on the client computer.

18. A method as described in claim 1, wherein the determining includes receiving an initial estimation of a sender that a level of proof for the outgoing message will be sufficient for the outgoing message to the intended recipient.

19. A method as described in claim 1, wherein the spam filters that are likely to be more aggressive operate on a computing device other than the client computer.

* * * * *